US009523397B2

(12) United States Patent
Uehara et al.

(10) Patent No.: US 9,523,397 B2
(45) Date of Patent: Dec. 20, 2016

(54) BREATHER STRUCTURE (71) Applicant: NISSAN MOTOR CO., LTD., Yokohama-shi, Kanagawa (JP)

(72) Inventors: Hiroki Uehara, Hadano (JP); Hideki Fujisawa, Yokohama (JP); Masahiro Kosaka, Ebina (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 113 days.

(21) Appl. No.: 14/432,494

(22) PCT Filed: Oct. 2, 2013

(86) PCT No.: PCT/JP2013/076824
§ 371 (c)(1),
(2) Date: Mar. 31, 2015

(87) PCT Pub. No.: WO2014/054692
PCT Pub. Date: Apr. 10, 2014

(65) Prior Publication Data
US 2015/0240886 A1 Aug. 27, 2015

(30) Foreign Application Priority Data
Oct. 4, 2012 (JP) ................................ 2012-222143

(51) Int. Cl.
*F16D 25/12* (2006.01)
*F16D 25/08* (2006.01)
(Continued)

(52) U.S. Cl.
CPC ............... *F16D 25/12* (2013.01); *F16D 25/08* (2013.01); *F16D 25/083* (2013.01);
(Continued)

(58) Field of Classification Search
CPC ........ F16D 25/08; F16D 25/083; F16D 25/12; F16H 57/027; F16H 2061/004; Y10T 137/3087
See application file for complete search history.

(56) References Cited

U.S. PATENT DOCUMENTS

| 5,421,439 A    | * | 6/1995 | Hayasaki ............ F16D 25/0638 |
|                |   |        | 192/106 F                           |
| 2011/0220451 A1| * | 9/2011 | Kuwahara et al. ... F16D 25/082    |
|                |   |        | 192/66.32                           |
| 2013/0098728 A1| * | 4/2013 | Shimada et al. ........ F16H 61/00  |
|                |   |        | 192/85.01                           |

FOREIGN PATENT DOCUMENTS

| JP | H11-141661 A  | 5/1999 |
| JP | 2009-191916 A | 8/2009 |

(Continued)

*Primary Examiner* — Richard Lorence
(74) *Attorney, Agent, or Firm* — Drinker Biddle & Reath LLP (57) ABSTRACT A breather structure is provided with: a communication passage which communicates a cylinder oil chamber with the atmosphere; and a stem which is disposed in the communication passage. A stem receiving section is formed in the side of the connection passage on the side of the cylinder oil chamber, the stem receiving section allowing the stem to be disposed inside with a clearance which allows air to be discharged from the cylinder oil chamber while maintaining the hydraulic pressure within the cylinder oil chamber. An air discharge section opened to the atmosphere is formed on the side of the atmosphere in the connection passage. Also, a pit section which releases the clearance to the air discharge section and a restricting section which restricts the movement of the stem toward the air discharge section are respectively formed in the inner peripheral surface of the communication passage.

4 Claims, 6 Drawing Sheets (51) Int. Cl.
*F16H 57/027* (2012.01)
*F16D 25/0638* (2006.01)
*F16H 61/00* (2006.01)

(52) U.S. Cl.
CPC ....... *F16H 57/027* (2013.01); *F16D 25/0638* (2013.01); *F16H 2061/004* (2013.01); *Y10T 137/3087* (2015.04)

(56) References Cited

FOREIGN PATENT DOCUMENTS

| | | | |
|---|---|---|---|
| JP | 2009-264549 A | | 11/2009 |
| JP | 2010-038174 A | * | 2/2010 |

* cited by examiner

BREATHER STRUCTURE

TECHNICAL FIELD

The present invention relates to an invention of a breather structure in which a stem is disposed in a communication passage communicating a hydraulic chamber of a hydraulic clutch apparatus and the atmosphere.

BACKGROUND

Conventionally, a breather structure or plug is known in which an opening is provided on a side surface of a cylinder housing and a hydraulic pressure chamber formed in the cylinder housing is communicated with the atmosphere by the opening (for example, Patent Document 1).

PRIOR ART LITERATURE

Patent Document

Patent Document 1: Japanese Unexamined Patent Application Publication No. H11-141661

SUMMARY OF THE INVENTION

Problem to be Solved by the Invention

However, the breather plug in the conventional technique is formed simply by a hole provided on the side of the cylinder housing, when discharging the air, hydraulic oil sometimes leaks through the hole. Therefore, the hydraulic oil pressure chamber is lowered so that it is difficult to hold the hydraulic pressure.

The present invention has been made in view of the above problem, and an object thereof is to provide a breather structure that is capable of holding the hydraulic pressure in the hydraulic pressure chamber.

Mechanism for Solving the Problem

To achieve the above object, the breather structure according to the present invention includes a communication passage which communicates the hydraulic pressure chamber of the hydraulic clutch apparatus with the atmosphere, and a stem disposed inside the communication passage.

Here, on the side of the hydraulic pressure chamber of the communication passage, a stem receiving section is formed for receiving or housing the stem via a clearance which in turn allows air to be discharged and to maintain the hydraulic pressure within the hydraulic pressure chamber, while on the side of the atmosphere, a discharge section is formed to be opened to the atmosphere.

Furthermore, in the inner peripheral surface of the communication passage, a pit section for opening or releasing the clearance to the exhaust section and a restricting section for restricting the movement of the stem toward the discharge section are respectively formed.

Effect of the Invention

In the breather structure according to the present invention, a stem is disposed via clearance within a stem receiving section which in turn is formed in a communication passage communicating a hydraulic pressure chamber with the atmosphere. Further, in the inner peripheral surface of the communication passage, a pit section to open the clearance to the atmosphere and a restricting section to restrict the movement of the stem to the side of the discharge section are respectively formed.

It should be noted that the clearance between the stem and the stem receiving section is configured to retain or maintain a hydraulic pressure within the hydraulic pressure chamber while allowing for air discharge. More specifically, the air within the hydraulic pressure chamber passes through the clearance due to a pressure in the hydraulic pressure chamber and is discharged thereafter to the discharge section through the pit section. On the other hand, the operating oil within the hydraulic pressure chamber is not allowed to pass through the clearance so as to be prevented from being discharged. Thus, while performing a smooth discharge of air contained in the operating oil, it is possible to hold or maintain the hydraulic pressure within the hydraulic pressure chamber.

Also, due to formation of the restricting section in the inner peripheral surface of the communication passage, even when the pressure in the hydraulic pressure chamber acts on the stem, the stem may be prevented from being moved to the side of the discharge section so that it is possible to ensure the hydraulic strength to the stem. As a result, it is possible to acquire a proper hydraulic retention function in the breather structure.

EMBODIMENT FOR IMPLEMENTING THE INVENTION

Figure 1:
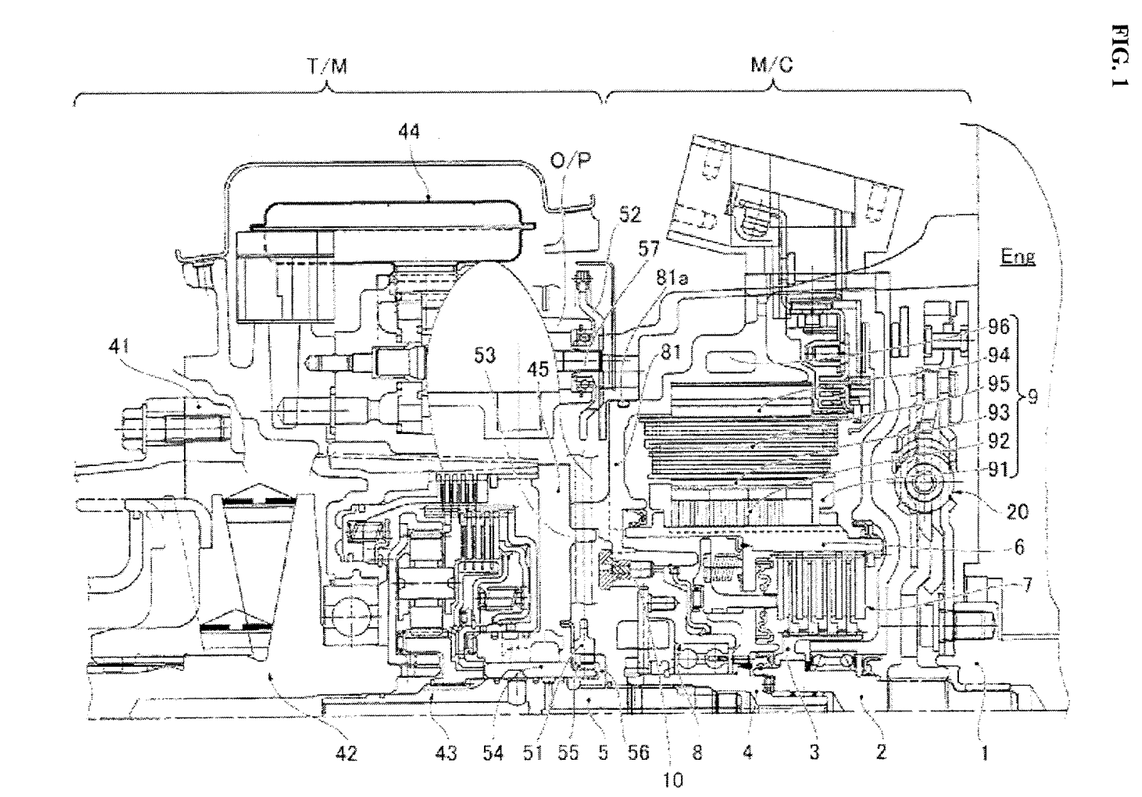
FIG. 1 is a schematic diagram showing an outline of a hybrid driving force transmission device to which a breather structure in a first embodiment is applied.

Hereinafter, a configuration of the breather structure according to the present invention will be described with reference to a first embodiment shown in the drawings.
(First Emodiment)
First, the configuration of a breather structure of the first embodiment will be described by dividing into three parts; i.e., the "overall configuration of the driving force transmitting device", the "structure of a motor and clutch unit," , and the "detailed construction of the breather structure".
[Overall Configuration of the Driving Force Transmission Apparatus]
FIG. 1 is a schematic diagram showing the overall hybrid drive force transmitting device to which the breather structure of the first embodiment is applied. Below, with reference to FIG. 1, description is made of the overall configuration of the driving force transmission apparatus in the first embodiment.

The hybrid drive force transmission apparatus in the first embodiment is provided with, as shown in FIG. 1, an engine Eng., a motor & clutch unit (hydraulic clutch unit) M/C, and a transmission unit T/M, an engine output shaft 1, a clutch hub shaft 2, a clutch hub 3, a clutch drum shaft 4, a transmission input shaft 5, a clutch drum 6, a multiple-plate dry clutch 7, a slave cylinder 8, and a motor/generator 9. In addition, the slave cylinder 8 to hydraulically control the engagement and disengagement of the multiple-plate dry clutch 7 is generally referred to as "CSC (abbreviation for Concentric Slave Cylinder)".

The hybrid drive force transmitting apparatus of the first embodiment operates in an electric vehicle running mode in which the motor/generator 9 and the transmission input shaft 5 are connected or engaged through the clutch drum 6 and the clutch drum shaft 4 when the multiple-plate dry clutch 7 which is normally open or in a disengaged. Also, when the multiple-plate dry clutch 7 is hydraulically controlled to he engaged by the slave cylinder 8, the clutch hub 3 and the clutch drum 6 are connected with each other so as to connect the engine output shaft I and the clutch hub shaft 2 via the dumper. In addition, the engine F and the motor/generator are connected to operate in the "hybrid vehicle running mode".

The motor and clutch unit M/C includes the multiple-plate dry clutch 7, the slave cylinder 8, and the motor/generator 9. The multiple-plate dry clutch 7 is connected to the engine Eng and configured to connect and disconnect the transmission of a driving force from the engine Eng. The slave cylinder 8 controls the engaging and the disengaging of the multiple-plate dry clutch 7 by an oil pressure. The motor/generator 9 is disposed at an outer peripheral position of the clutch drum 6 disposed outside the multiple-plate dry clutch 7 to transmit the driving force of the motor/generator 9 to the transmission output shaft 5 through the clutch drum 6. A cylinder housing 81 including a first clutch pressure oil passage 84 (see FIG. 5) connecting to the slave cylinder 8 and the breather structure is provided on the motor and clutch unit M/C with being sealed through an O-ring 81a.

The motor/generator 9 is a synchronous type-alternate current electric motor and includes a rotor supporting frame 91 provided integrally with the clutch drum 6, a rotor 92 which is fixedly supported by the rotor supporting frame 91 and in which a permanent magnet is embedded, a stator 94 disposed outside the rotor 92 with an air gap 93 and fixed to the cylinder housing 81, and a stator coil 95 wound on the stator 94. Meanwhile, a water jacket 96 to pass cooled water is provided in the cylinder housing 81.

The transmission unit T/M is connected to the motor & clutch unit M/C and includes a transmission housing 41, a V belt type-continuously variable mechanism 42, and an oil pump O/P. The V belt type-continuously variable mechanism 42 is housed in the transmission housing 41, and configured to acquire a non-step variable ratio by winding a V belt between two pulleys and changing a contacting diameter of the pulleys coming in contact with the belt. The oil pump O/P is an oil source which supplies an oil pressure to a required part, makes an oil pump pressure as an original pressure, and guides an oil pressure from a control valve (not shown) which adjusts a variable oil pressure to a pulley chamber, a clutch and braking oil pressure or the like, to the required part. The transmission unit T/M is further provided with a mechanism 43 for exchanging forward and backward running of a car, an oil tank 44, and an end plate 45. The end plate 45 includes a second clutch oil or hydraulic pressure passage (not shown).

The oil pump O/P is configured to perform pump driving by transmitting a rotational driving torque of the transmission input shaft 5 through a chain driving mechanism. The chain driving mechanism includes a drive side sprocket 51 rotating in accordance with the rotational driving of the transmission input shaft 5, a driven sprocket 52 rotating a pump shaft 57, and a chain wound on the driving side sprocket 51 and the driven sprocket 52. The drive side sprocket 51 is disposed between the transmission input shaft 5 and the end plate 45 and rotatably supported on a stator shaft 54 fixed to the transmission housing 41, through a bush 55. The rotational driving torque from the transmission input shaft 5 is transmitted to the drive side sprocket 51 through a first adapter 56 which is configured to be splined to the transmission input shaft 5 and to be connected to the drive side sprocket 51 by a hook.

[Motor & Clutch Unit Configuration]

Figure 2:
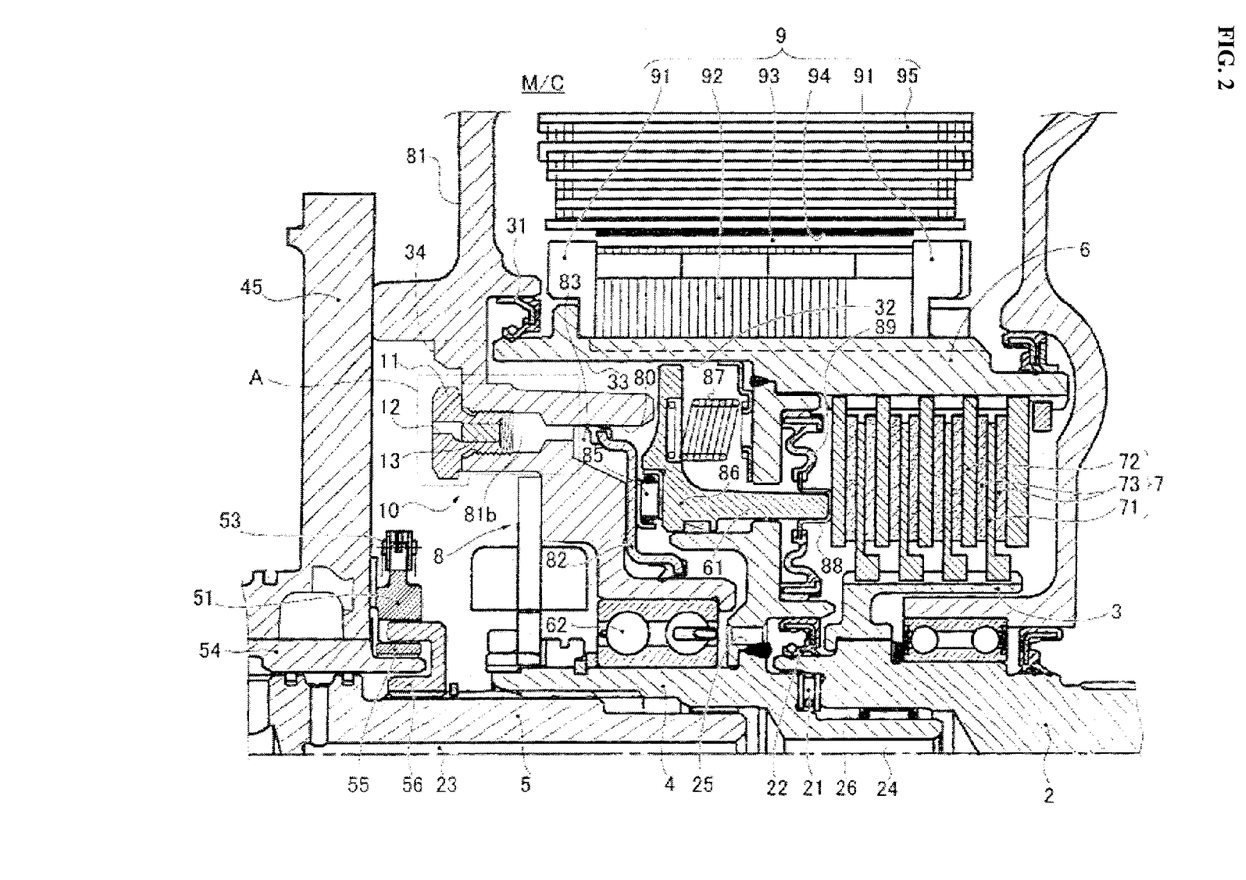
FIG. 2 is a main cross-sectional view showing a configuration of a motor & clutch unit in a hybrid drive force transmitting device in the first embodiment.

FIG. 2 is a sectional view showing a main configuration of the motor & clutch unit M/C in the hybrid driving force transmission apparatus in the first embodiment. Below, description is give of the configuration of the motor and clutch unit in the first embodiment with reference to FIG. 2.

The clutch hub 3 is connected to the engine output shaft 1 of the engine Eng. The multiple-plate dry clutch 7 includes a plurality of drive plates 71 (first clutch plates) which are splined to the clutch hub 3, as shown in FIG. 2.

The clutch drum 6 is connected to the transmission input shaft 5 of the transmission unit T/M. The multiple-plate dry clutch 7 includes a plurality of driven plates 72 (second clutch plates) which are splined to the clutch drum 6, as shown in FIG. 2.

The plurality of driven plates 72 are disposed with intervals between each other and the plurality of drive plates 71 each have frictional facings 73, 73 attached to both surfaces of the driven plates 72. The driven plates 72 and the drive plates 71 are disposed between the clutch hub 3 and the clutch drum 6. The multiple-plate dry clutch 7 is formed by arranging the drive plates 71 each having the frictional facings 73, 73 between the adjacent driven plates 72. That is to say, a torque is transmitted (connected) between the clutch hub 3 and the clutch drum 6 by engaging (fastening) the multiple-plate dry clutch 7, and a torque is not transmitted (disconnected) between the clutch hub 3 and the clutch drum 6 by disengaging (releasing) the multiple-plate dry clutch 7.

The slave cylinder 8 is an oil pressure actuator to control the fastening and the releasing of the multiple-plate dry clutch 7 and is disposed between the transmission unit T/M and the clutch drum 6. As shown in FIG. 2, the slave cylinder 8 includes a cylinder housing 81, a piston 82, a cylinder oil chamber (hydraulic pressure chamber) 83, a first clutch pressure hydraulic passage 84 (see FIG. 5), and the breather structure 10. In addition, a needle bearing 85, a piston arm 86, a return spring assembly 74 and an arm press-fitting plate 88 are interposed between the piston 82 and the multiple-plate dry clutch 7.

The piston 82 is slidably provided in the cylinder bore 80 of the cylinder housing 81. The cylinder oil chamber 83 is an inside space defined by the piston 82 inside of the cylinder bore 80 and is communicative through the first clutch pressure oil passage 84 with the second clutch pressure oil passage (not shown) which is formed in the end plate 45. The first clutch pressure oil passage 84 passes through the cylinder housing 81, and guides the clutch pressure that is created by the transmission unit T/M to the cylinder oil chamber 83. The breather structure 10 releases the air in the cylinder oil chamber 83 to the atmosphere.

The piston arm 86 is provided slidably in a through hole 61 provided in the clutch drum 6 and is configured to generate a pressure force against the clutch plates of the multiple-plate dry clutch 7 by a hydraulic pressure in the cylinder oil chamber 83. The return spring 87 is interposed between the piston arm 86 and the clutch drum 6. The needle bearing 85 is interposed between the piston 82 and the piston arm 86 and is configured to prevent the piston 82 from being rotated in accordance with the rotation of the piston arm 86. The arm-press fitting plate 88 is fixed to an intermediate position of the elastic bellows seal member 89 and press fitted to the tip of the piston arm 86 which projects on the side of the multiple-plate dry clutch 7 through the through hole 61. Also, the outer periphery of the elastic bellows seal member 89 is press fitted to the clutch drum 6. By means of the arm press-fitting plate 88 and the elastic bellows seal member 89, leaked oil from the piston arm 86 is blocked from flowing into the multiple-plate dry clutch 7. In other words, the arm press-fitting plate 88 and the elastic bellows seal member 89 which are fixed hermetically to an attaching position at which the piston arm 86 is attached to the clutch drum 6 are intended to function to separate a wet space filled with oil in which the slave cylinder 8 is disposed and a dry space in which the multiple-plate dry clutch 7 is disposed.

As shown in FIG. 2, a leaked oil recovery passage in the first embodiment includes a first hearing 62, a first seal member 31, a leaked oil passage 32, a first recovery oil passage 33, and a second recovery oil passage 34. More specifically, the leaked oil recovery passage circuit is intended to return leaked oil from a sliding portion of the piston 82 to the transmission unit T/M through the first recovery oil passage 33 sealed by the first seal member 31 and the second recovery oil passage 34 communicating 2 with the first recovery oil passage 33. In addition, the leaked oil recovery passage circuit returns leaked oil from a sliding portion of the piston arm 86 to the transmission unit T/M through the leaked oil passage 32 sealed by a separator seal structure (arm press-fitting plate 88 and the elastic bellows seal member 891 and through, the first recovery oil passage 33/second recovery oil passage 34 sealed by the first bearing 62 and the first seal member 31, A bearing lubrication oil passage circuit in the first embodiment includes a needle bearing 21, a second seal member 22, a first shaft center oil passage 23, a second shaft center oil passage 24, a lubrication oil passage 25, and a clearance 26, as shown in FIG. 2. The bearing lubrication oil circuit supplies the bearing lubricating oil that has passed through the first shaft center oil passage 23, the second shaft center oil passage 24, the clearance 26 from the transmission unit T/M to the needle bearing 21. Also, the bearing lubricating oil circuit supplies through the lubricating oil passage 25 lubricating oil to the first bearing 62 that rotatably supports the clutch drum 6 relative the cylinder housing 81 and to the needle bearing 85. The bearing lubricating oil will be returned to the transmission unit T/M after having passed through the First recovery oil circuit 33, the second recovery oil circuit 34.

Note that the second seal member 22, as shown in FIG. 2, is interposed between the clutch hub 3 and the clutch drum 6. The second seal member 22 seals the bearing lubricating oil from flowing from the wet space in which the slave cylinder 8 is disposed to the dry space in which the multiple-plate dry clutch 7 is disposed.

[Detailed Construction of the Breather Structure]

Figure 3:
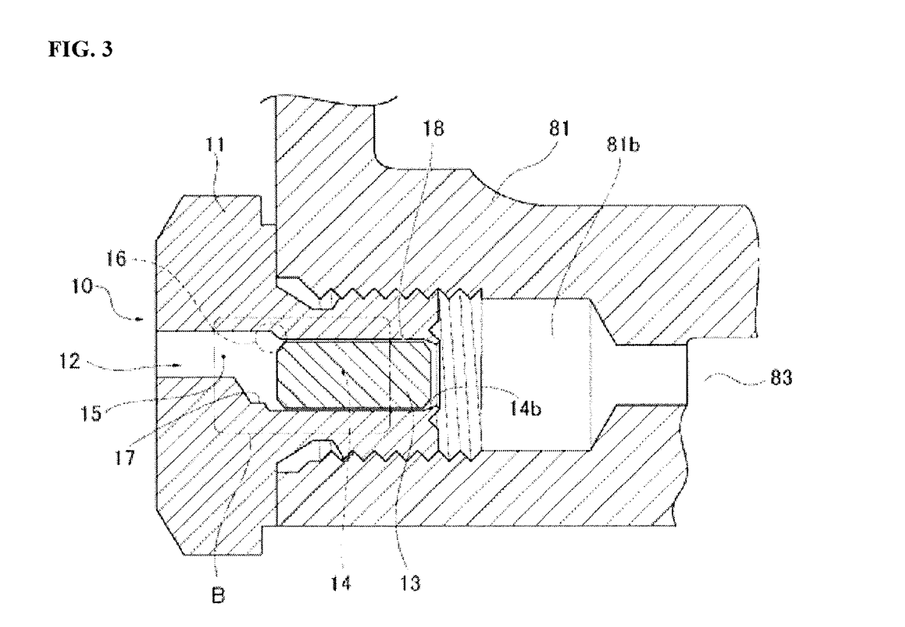
FIG. 3 is an enlarged view of a portion A in FIG. 2.
Figure 4A:
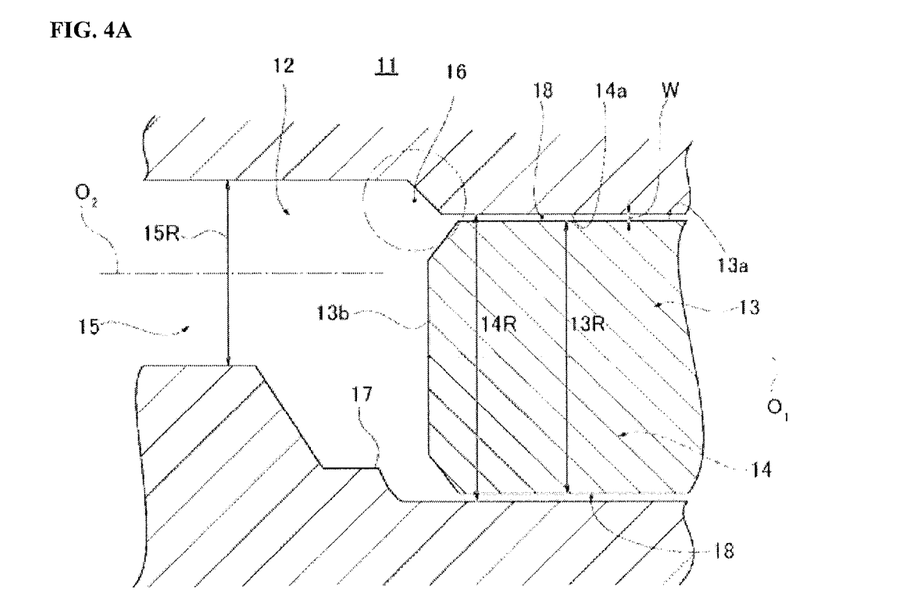
FIG. 4A is an enlarged view of a portion B in FIG. 3 in a state in which the stem is positioned at the center of the communication passage.
Figure 4B:
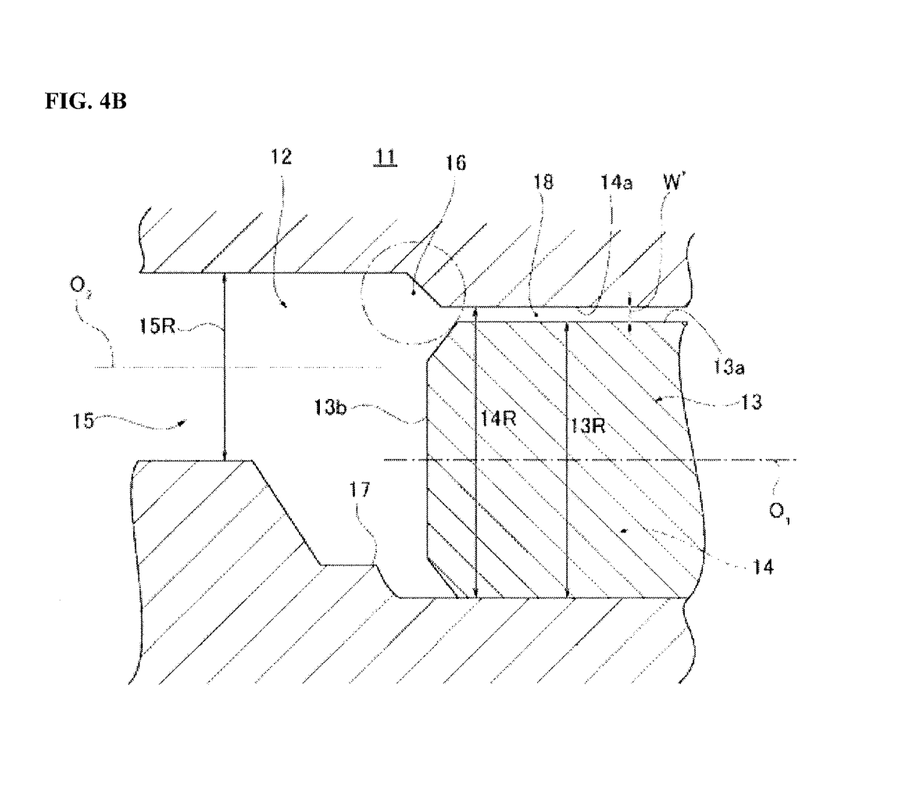
FIG. 4B is another enlarged view of the portion B in FIG. 3 showing a state in which the stem is disposed at a position offset from the center of the communication passage.
Figure 5:
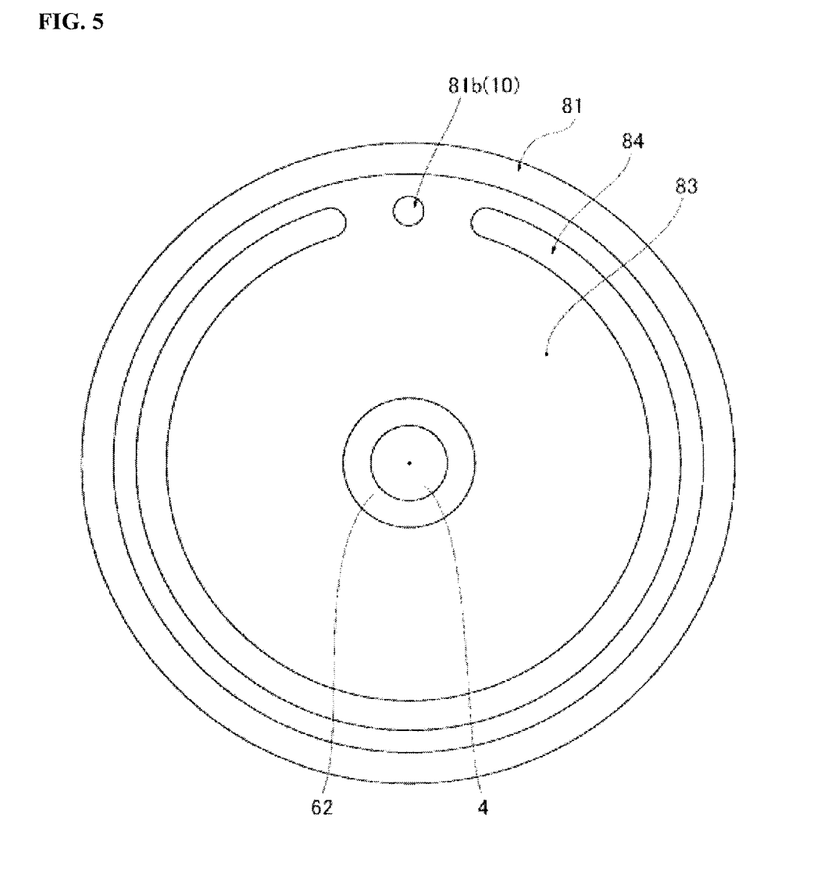
FIG. 5 is an explanatory view showing a positional relationship between the communication passage and the oil passage in the first embodiment.

FIG. 3 is an enlarged view of a portion A in FIG. 2;

FIG. 4A is an enlarged view of a portion B in FIG. 3 in a state in which the stem is positioned at the center of the communication passage;

FIG. 4B is another enlarged view of the portion B in FIG. 3 showing a state in which the stem is disposed at a position offset from the center of the communication passage;

and FIG. 5 is an explanatory view showing a positional relationship between the communication passage and the oil passage in the first embodiment. Below with reference to FIGS. 3-5, the detailed construction of the breather structure in the first embodiment is given.

The breather structure 10 is provided in the screw member (mounting member) 11 which is provided detachably with respect to the cylinder housing 81, and includes a communication passage 12, a stem 13 made of a metal cylindrical body which is disposed in the communication passage 12. Here, the screw member 11 is screwed (screw fitting) into a through screw hole 81b formed in the cylinder housing 81. As shown in FIG. 2, the through screw hole 81b penetrates the cylinder housing 81, and is communicated with the cylinder oil chamber 83. The through screw hole 81b is further opposed to the end plate 45 with a gap therebetween.

The communication passage 12 penetrates the screw member 11 in the axial direction thereof and communicates, through the through screw hole 81b, the cylinder oil chamber 83 and the atmosphere (here, the space between the end plate 45 and the cylinder housing 81) each other. Inside the communication passage 12, a stem receiving section 14, a discharge section 15, a pit section 16, and a restricting section 17 are formed.

The stem receiving section 14 is formed in the communication passage 12 on the side of the end of the cylinder oil chamber 83 and is intended to receive or accommodate the stem inside. The stem receiving section 14 is a cylindrical space with a central axis O1 extending parallel to the direction of air flow discharged from the cylinder oil chamber 83. The inner diameter 14R of the stem receiving section 14 is, as shown in FIG. 4A, configured to be larger than the outer diameter 13R of the stem 13. Also, between the inner peripheral surface 14a of the stem receiving section 14 and the outer peripheral surface 13a of the stem 13, a clearance 18 is formed. Here, the clearance 18 is formed over the entire circumference of the stem 13, and the average size of the gap W in the radial direction is set to a dimension that allows the air to be discharged from the cylinder oil chamber 83. Furthermore, as shown in FIG. 4B, the maximum gap size W' of the clearance 18 in the radial direction is set to a dimension at which the leak amount of operating oil from the cylinder oil chamber 83 is restricted to a preset amount and that may prevent air from entering the cylinder oil chamber 83 from the atmosphere.

Note that the "average gap size W" means a gap size in a state in which the center axis of the stem 13 and the center axis O1 of the stem receiving section match each other, and is uniform over the entire circumference of the stem 13 (see FIG. 4A). On the other hand, the "maximum gap size W'" is a maximum value of the gap size when a portion of the outer peripheral surface 13a of the stem 13 is in contact with the inner peripheral surface 14a of the stem receiving section 14 (see FIG. 4B).

Furthermore, the "dimension that allow air to be discharged from the cylinder oil chamber 83" refers to such a dimension at which the surface tension of the operating oil flowing into the clearance 18 is overcome and air is allowed to be pushed to pass through toward the side of the atmosphere under the pressure of the cylinder oil chamber 83. Thus, the air in the cylinder oil chamber 83 will be discharged to the atmosphere.

In addition, the " dimension at which the leak amount of operating oil from the cylinder oil chamber 83 is restricted to a preset amount" allows an arbitrarily set leak amount within a range that would not substantially affect the hydraulic pressure in the cylinder oil chamber 83. If the gap size of the clearance 18 is too large, the hydraulic force in the cylinder oil chamber 83 decreases due to the large leakage. Therefore, leakage of the operating oil through the clearance 18 is allowed at the amount needed, which holds the hydraulic pressure of the cylinder oil chamber 83.

The "dimension that may prevent air from entering the cylinder oil chamber 83 from the atmosphere," refers to such a size at which the surface tension of the operating oil or hydraulic fluid flowing into the clearance 18 would not allow air to pass through, which is pushed toward the cylinder oil chamber 83. Thus, the air is not allowed to enter the cylinder oil chamber 83 from the atmosphere.

The discharge section 15 is formed in the communication passage 12 on the side of the atmosphere, i.e., at the end plate 45 side, and is provided with an opening to the atmosphere, which faces the end plate 45. The discharge section 15 is a cylindrical space with a center axis O2 extending parallel to the discharge direction of air flow from the cylinder oil chamber 83. As shown in FIG. 4A, the inner diameter 15R is sized to be smaller than the inner diameter 14R of the stem receiving section 14. In addition, the center axis O2 of the discharge section 15 extends in parallel to and is offset from the center axis O1 of the stem receiving section 14.

The pit section 16 is formed in a recess in the inner peripheral surface of the communication passage between the stem receiving section 14 and the exhaust section 15, which is open to the discharge section. The pit section 16 is formed in a position closer to the cylinder oil chamber 83 than the restricting section 17. In other words, the pit section is formed by recessing the inner peripheral surface 14a of the stem receiving section 14, which faces the outer peripheral surface 13a of the stem 13 to enlarge the gap size of the clearance 18 and by extending this gap enlarged area up until to the discharge section 15.

The restricting section or portion 17 is formed in the peripheral surface of the communication passage between the stem receiving section 14 and the discharge section 15 and protrudes into the inside of the communication passage 12 for limiting the movement of the stem 13 toward the discharge section 15. More specifically, when the stem 13 is pressed toward the discharge section 15, one end surface 13b of the stem 13 interfaces with the restricting section 17. Movement of the stem 13 will thus be restricted.

Note that the open end of the stem receiving section 14 on the side of the cylinder oil chamber 83 is formed with a second restricting section 14b as well that will restrict the movement of the stem 13 toward the cylinder oil chamber 83.

Further, the breather structure 10, as shown in FIG. 5, is formed in the same circular arc as the first clutch pressure hydraulic passage 84 and is disposed in a offset position (inclined position) with respect to the first clutch pressure hydraulic passage 84.

Now, the operation of the breather structure in the first embodiment is described at paragraphs in the "air discharge and hydraulic retention effect", and the "restricting operation of the stem,", individually.

[Air Discharge and Hydraulic Retention Effects]

Figure 6:
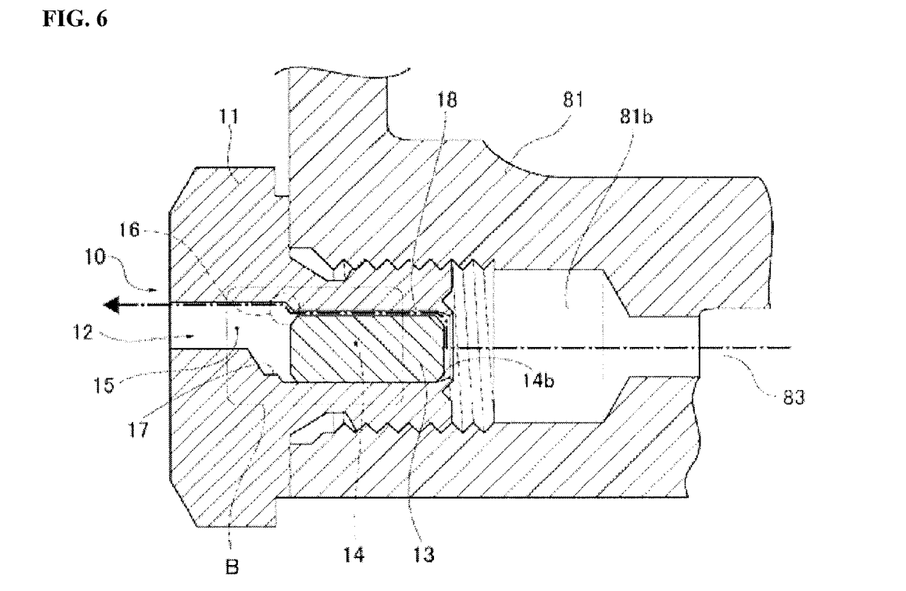
FIG. 6 is an explanatory view showing an air discharge path in the breather structure of the first embodiment.

FIG. 6 is an explanatory view showing the air discharge path in the breather structure of the first embodiment.

In the slave cylinder 8 in the first embodiment, the air contained in the operating oil within the cylinder oil chamber 83 is pressed toward the atmosphere (here the space defined between the end plate 45 and the cylinder housing 81) by the hydraulic pressure of the cylinder oil chamber 83 at all times. Here, in the breather structure 10, the stem 13 is arranged in the communication passage 12 formed in the screw member 11 attached to the cylinder housing 81, and a clearance 18 is produced between the outer peripheral surface 13a of the stem 13 and the inner peripheral surface 14a of the stem receiving section 14 formed inside of the communication passage 12.

In this case, the average gap size W in the radial clearance 18 is set to a dimension that allows the air to be discharged from the cylinder oil chamber 83. Therefore, the air in the cylinder oil chamber 83 enters into the operating oil chamber against the surface tension of the operating oil flowing into the clearance 18 to pass through the clearance 18.

Then, by forming the pit section 16 in the inner peripheral surface of the communicating passage between the stem receiving section 14 and the discharge section 15, as shown in FIG. 6, the air that has passed through the clearance 18 flows into the discharge section 15 via the pit section 16. Thus, the air that has passed through the clearance 18 may be discharged to the discharge section smoothly to thereby ensure a smooth evacuation.

On the other hand, the maximum radial gap size W' of this clearance 18 is set to a dimension which restricts the leak amount of the operating oil from the cylinder oil chamber 83 to a preset leak amount. Therefore, although the leak amount is set arbitrarily, there is no adverse effect on the hydraulic pressure in the cylinder oil chamber 83 and the hydraulic pressure will be maintained in the cylinder chamber 83. In other words, the operating oil in the cylinder oil chamber 83 cannot pass through the clearance at an amount larger that the preset amount so that discharge from the cylinder oil chamber 83 will be restricted. Tus, the hydraulic force may be prevented from decreasing greatly so that the hydraulic pressure in the cylinder oil chamber 83 may be maintained.

Since the leak amount required is allowed, for example, when the hydraulic pressure in the cylinder oil chamber 83 increases excessively, the operating oil is allowed to leak through the clearance 18, and the hydraulic pressure of the cylinder oil chamber 83 can be maintained. In other words, by adjusting the gap size of the clearance 18 appropriately, the leak amount of the operating oil from the cylinder oil chamber 83 may be adjusted to thereby allow to adjust hydraulic pressure with a simple construction.

Further, the maximum radial gap size W' of this clearance 18 is set to a dimension that allows to prevent air from entering the cylinder oil chamber 83 from the atmosphere. Therefore, it is possible to prevent the air backflow to the cylinder oil chamber 83.

Thus, by forming the clearance 18 with respect to the stem 13 in the communication passage 12 as well as the pit section 16, the stem 13 is not required to incorporate therein a flow path for discharging air (for example, a groove or the like extending in the discharge direction of the air). In other words, the breather structure 10 may acquire an air discharge function as well as a hydraulic pressure maintaining function by suitably processing the communication passage 12 to thereby achieve an overall inexpensive structure.

Further, even when contamination is included in the operating oil, since the air flows out to the discharge section 15 via the pit section, the air is caused to flow through the clearance at rapid speed so that the discharge performance of the contamination may be increased.

[Restricting Effect of the Stem]

Figure 7:
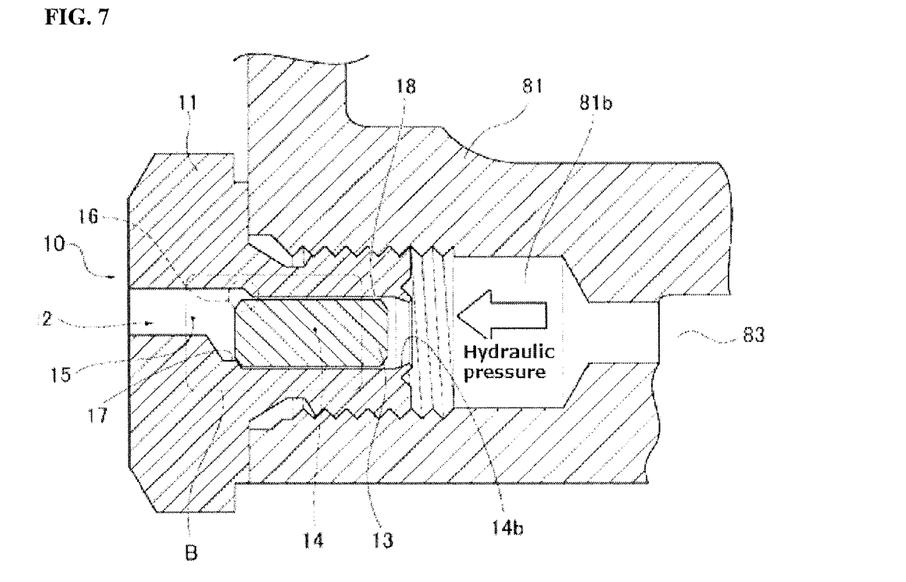
FIG. 7 is an explanatory view showing a state where the stem is pressed by the hydraulic pressure in a hydraulic breather structure of the first embodiment.

FIG. 7 is an explanatory view showing a state where the stem is pressed by a hydraulic pressure in the breather structure of the first embodiment.

In the slave cylinder 8 of the first embodiment, by way of the hydraulic pressure within the cylinder oil chamber 83, the step 13 is pushed towards the atmosphere (here the space between the end plate 45 and the cylinder housing 81), and, as shown in FIG. 7, the stem 13 moves toward the discharge section 15. Here, since the breather structure 10 is formed with the restricting section 17 in the inner peripheral surface of the communication passage between the stem receiving section 14 and the discharge section 15, the stem that has moved toward the discharge section 15 will interfere at its one end 13b with the restricting section 17.

Thus, movement of the stem 13 in the communication passage 12 is blocked. Thus, the stem 13 is prevented from entering the side of the discharge section 15. Incidentally, since the pit section 16 is formed on the side of the cylinder oil chamber 83 with respect to the restricting section 17, even when the step 13 conflicts on the restricting section 17, as shown in FIG. 7, the pit section 16 will not be closed to the discharge section 15. Therefore, even when the stem 13 is pressed by the hydraulic pressure of the cylinder oil chamber 83, it is possible to exhaust the air smoothly.

Further, by restricting the movement of the stem 13 by the restricting section 17, for example as compared with the case in which a Welch plug or a core plug is fit into the discharge section 15 to prevent the stem 13 from escaping to the atmosphere, the stem 13 may be configured to be less escapable to the atmosphere side so that the risk in coming off may be reduced. In addition, the restricting section 17 is integrally formed with the screw member 11 constituting the communication passage 12, which would further improve the come-off resistance property of the stem.

Moreover, in the breather structure 10 of the slave cylinder 8 in the first embodiment, the center axis O2 of the discharge section 15 is arranged in parallel to and offset from the center axis O1 of the stem receiving section 14. Thus, at a boundary portion between the stem receiving section 14 and the discharge section 15, steps are produced, which form respectively the pit section 16 and the restricting section 17. Thus, the pit section 16 and the restricting section 17 may be formed with a simple structure to thereby achieve a less expensive construction.

In addition, the slave cylinder 8 in the first embodiment, the breather structure 10 is formed in the screw member 11 which is screw fit into the through screw hold 81b formed in the cylinder housing 81. That is, the screw member 11 is thus removably attached to the cylinder housing 81.

Thus, for example, as compared to the case in which the come-off prevention of the stem 13 is purported by fitting a Welch plug into the through screw hole 81b, the breather structure 10 may be provided with ease. Further, for example even when the gap size of the clearance between the stem 13 and the stem receiving section 14 is changed for adjusting the leak amount of the cylinder oil chamber 83, the size change of the breather structure 10 may be done by simply replacing the screw member.

Now, description is made of effect.

According to the breather structure in the first embodiment, it is possible to obtain the following effects.

(1) A breather structure having a communication passage 12 communicating a hydraulic pressure chamber (cylinder oil chamber) 83 of a hydraulic clutch apparatus (motor & clutch unit) M/C with an atmosphere and a stem disposed inside of the communication passage 12, the breather structure comprising:

a stem receiving section 14 formed in the communication passage in which a stem 13 is disposed on the side of the hydraulic pressure chamber 83 via a clearance that allows air in the hydraulic pressure chamber to discharge while maintaining a hydraulic pressure within the hydraulic pressure chamber 83;

a discharge section 15 formed in the communication passage 12 on the side of the atmosphere, the discharge section opening to the atmosphere;

a pit section 16 formed in the inner peripheral surface of the communication passage 12, the pit section releases the clearance 18 to the discharge section 15; and a restricting section 17 formed in the inner peripheral surface of the communication passage, the restricting section restricting the movement of the stem 13 toward the discharge section 15.

Thus, it is possible for the breather structure 10 to have a hydraulic pressure retention function and improve the come-off resistance property.

(2) It is configured to offset the center axis O2 of the discharge section 15 with respect to the center axis O1 of the stem receiving section 14.

Thus, it is possible to form a pit section 16 and a restricting section 17 with a simple structure to achieve less expensive structure.

(3) The communication passage 12 is provided in a mounting member (screw member)11 detachably coupled to a cylinder housing 81 of the hydraulic clutch apparatus (motor & clutch unit) M/C in which the hydraulic pressure chamber (cylinder oil chamber) 83 is formed and a piston 82 dispose inside subject to slide in response to supply/discharge of the operating oil into/out of the cylinder oil chamber 83.

Thus, as compared with the case in which the stem 13 is intended to be retained by Welch plug, it is possible to improve the assembling performance of the stem and to easily resize the breather structure 10.

As described above, the breather structure according to the present invention has been described on the basis of the first embodiment, the specific configuration is not limited to this embodiment. Without departing from the gist of the invention according to each claim of Claims, design changes or additions are acceptable.

In the first embodiment, an example is shown in which the dimension of the gap size of the clearance 18 is set to allow the leak amount within an allowable range. However, the size is set to block the leakage of the operating oil while allowing passage of air. In other words, the configuration is such that leakage of the operating oil is not allowed from the breather structure 10.

In the first embodiment, an example is shown in which a screw or threaded member 11 is attached by screw engaging to the cylinder housing 81. However, the configuration is not limited thereto. A mounting member provided with the breather structure 10 may be attached to the cylinder housing 81 by pawl engagement. Further, the breather structure 10 may be attached to the cylinder housing 81 directly.

In the first embodiment, with respect to the discharge direction of the air discharged from the cylinder oil chamber 83, the center axis O1 of the stem receiving section 14 and the center axis O2 of the discharge section 15 are parallel to each other while the center axis O2 are offset. However, the center axis O1 and the center axis O2 are not necessarily to be parallel to the direction of the air discharge. Also, the center axis O2 is not required to be parallel to the center axis O1. In other words, the direction of extension of the center axis's O1, O2 may be changed so as for the direction of air discharge will change in the middle of the communication passage 12.

Furthermore, in the first embodiment, an example is shown in which, as a hydraulic clutch apparatus, a motor and a clutch are integral to form a motor & clutch unit M/C. However, the motor and the clutch unit may be separate components. Further, as a clutch in the motor & clutch unit M/C, an example of the multiple-plate dry clutch is shown. However, single-plate dry clutch, a multiple-plate wet clutch, or the like may be employed.

Moreover, in the first embodiment, an example is shown in which the breather structure according to the present invention is applied to a hybrid driving force transmitting apparatus that is installed with an engine and a motor/generator and that uses a dry clutch as a transferring clutch of driving modes. However, the configuration is not limited thereto. For example, the invention may be applied to a starting clutch for use in an engine driven vehicle propelled by the engine only as driving source, or to a clutch of a stepped automatic transmission clutch.

CROSS-REFERENCE TO RELATED APPLICATIONS

The present application claims priority based on Japanese Patent Application No. 2012-222143, filed in Japan Patent Office on Oct. 4, 2012, and the entire disclosure of which is incorporated herein by reference in its entirety.

The invention claimed is:

1. A breather structure having a communication passage communicating a hydraulic pressure chamber of a hydraulic clutch apparatus with an atmosphere and a stem disposed inside of the communication passage, the breather structure comprising:

a stem receiving section formed in the communication passage in which the stem is disposed on the side of the hydraulic pressure chamber via a clearance that allows air in the hydraulic pressure chamber to discharge while maintaining a hydraulic pressure within the hydraulic pressure;

a discharge section formed in the communication passage on the side of the atmosphere, the discharge section opening to the atmosphere;

a restricting section formed in the inner peripheral surface of the communication passage, the restricting section restricting the movement of the stem toward the discharge section; and a pit section formed in the inner peripheral surface of the communication passage closer to the side of the hydraulic pressure chamber than the restricting section, the pit section configured to release the clearance to the discharge section.

2. The breather structure as claimed in claim 1, wherein the center axis O2 of the discharge section is configured to be offset with respect to the center axis O1 of the stem receiving section.

3. The breather structure as claimed in claim 1, wherein the communication passage is provided in a mounting member detachably coupled to a cylinder housing of the hydraulic clutch apparatus in which the hydraulic pressure chamber is formed and a piston disposed inside subject to slide in response to supply/discharge of the operating oil into/out of the cylinder oil chamber.

4. The breather structure as claimed in claim 2, wherein the communication passage is provided in a mounting member detachably coupled to a cylinder housing of the hydraulic clutch apparatus in which the hydraulic pressure chamber is formed and a piston disposed inside subject to slide in response to supply/discharge of the operating oil into/out of the cylinder oil chamber.

* * * * *